US012784495B2

(12) United States Patent
Yang et al.

(10) Patent No.: US 12,784,495 B2
(45) Date of Patent: Nov. 3, 2026

(54) APPLICATION AND A SYSTEM FOR ASSISTING IN CORRECTLY ARRANGING A HEARING AID

(71) Applicant: GN Hearing A/S, Ballerup (DK)

(72) Inventors: Qi Yang, Chicago, IL (US); Michalis Papakostas, Chicago, IL (US); Jason-Yves Tissières, Eindhoven (NL); Gregory Brian Olsen, Lombard, IL (US)

(73) Assignee: GN HEARING A/S, Ballerup (DK)

( * ) Notice: Subject to any disclaimer, the term of this patent is extended or adjusted under 35 U.S.C. 154(b) by 125 days.

(21) Appl. No.: 18/625,119

(22) Filed: Apr. 2, 2024

(65) Prior Publication Data

US 2025/0308283 A1 Oct. 2, 2025

(51) Int. Cl.

*G06V 40/16* (2022.01)
*G06V 40/20* (2022.01)
*H04R 25/00* (2006.01)
*H04R 25/02* (2006.01)

(52) U.S. Cl.

CPC .......... *G06V 40/165* (2022.01); *G06V 40/171* (2022.01); *G06V 40/20* (2022.01); *H04R 25/02* (2013.01); *H04R 25/30* (2013.01); *H04R 25/70* (2013.01); *G06V 2201/03* (2022.01)

(58) Field of Classification Search

CPC .... G06V 40/165; G06V 40/171; G06V 40/20; G06V 2201/03; H04R 25/02; H04R 25/30; H04R 25/70; H04R 25/305; H04N 23/611; H04N 23/632; H04N 23/633; H04N 23/64; H04N 23/60

See application file for complete search history.

(56) References Cited

U.S. PATENT DOCUMENTS

2005/0088435 A1* 4/2005 Geng .................. H04R 25/658 345/419
2013/0169779 A1* 7/2013 Pedersen ................ H04R 25/70 348/E7.085
2016/0344935 A1 11/2016 Ardö
2021/0089773 A1* 3/2021 Yang ...................... H04N 23/63

(Continued)

OTHER PUBLICATIONS

European Search Report and Written Opinion for EP Patent Appln. No. 24175667.5 dated Oct. 14, 2024.

(Continued)

*Primary Examiner* — John B Strege

(74) *Attorney, Agent, or Firm* — Vista IP Law Group, LLP

(57) ABSTRACT

Disclosed is a system and an application configured to be executed by a first electronic device, the first electronic device comprising a camera and a display, the application being for assisting in correctly arranging a hearing aid in and/or at an ear of a wearer of the hearing aid, the application being configured for: providing access to a camera application associated with the camera of the first electronic device; enabling a viewfinder of the camera application to display a preview of the field-of-view of the camera; determining if the wearer's head is aligned with the camera; determining if the wearer's head has begun to rotate relative to the camera; and initiating a capture sequence capturing a plurality of images, the plurality of images showing at least part of the ear of the wearer with the hearing aid arranged in and/or at the ear as the wearer's head rotates.

52 Claims, 5 Drawing Sheets

(56) References Cited

U.S. PATENT DOCUMENTS

| | | | | |
|---|---|---|---|---|
| 2022/0322019 | A1* | 10/2022 | Guo | H04R 25/453 |
| 2022/0386048 | A1* | 12/2022 | Griffin | H04R 25/507 |
| 2023/0362560 | A1 | 11/2023 | Gavish et al. | |
| 2024/0122543 | A1* | 4/2024 | Pedersen | A61B 5/6815 |
| 2025/0008280 | A1* | 1/2025 | Li | G06T 7/70 |

OTHER PUBLICATIONS

Foreign Examination Report for EP Patent Appln. No. 24 175 667.5 dated Sep. 16, 2026.

* cited by examiner

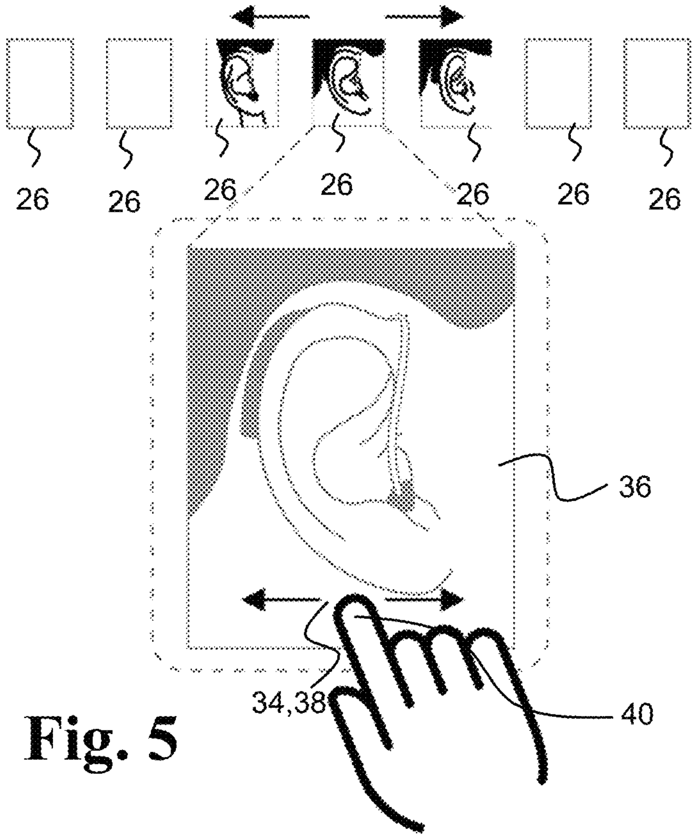
Fig. 5
Fig. 6
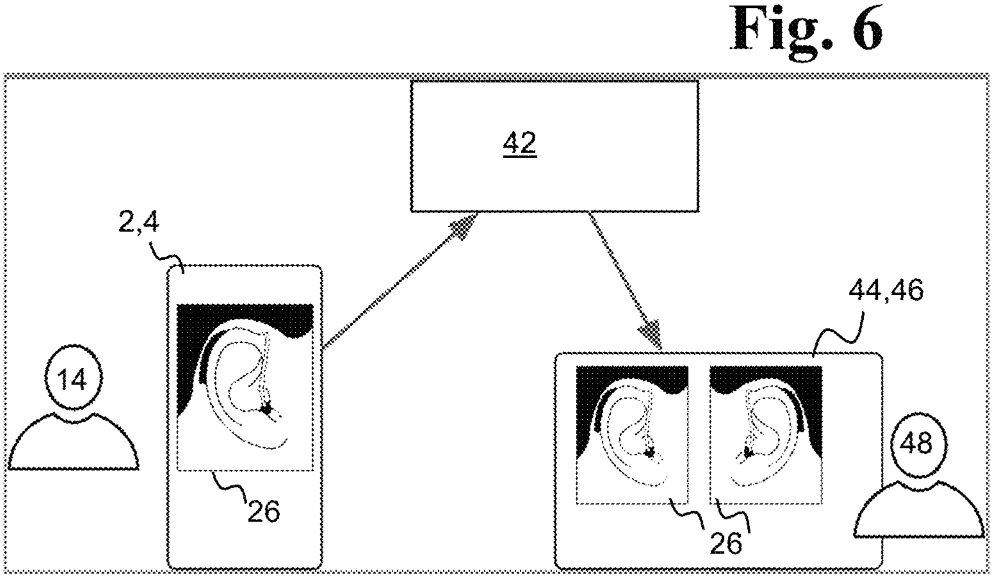

APPLICATION AND A SYSTEM FOR ASSISTING IN CORRECTLY ARRANGING A HEARING AID

FIELD

The present disclosure relates to an application and a system for assisting in correctly arranging a hearing aid in and/or at an ear of a wearer of the hearing aid. The application is to be executed by a first electronic device having a camera and a display. The system comprises said application and further comprises a second application to be executed by a second electronic device.

BACKGROUND

Persons with various degrees of hearing loss or impaired hearing, may wear a hearing aid to improve hearing. Hearing aid settings are flexible, comprehensive and complex. Thus, good settings are highly personalized and may be hard to achieve. The settings are identified during a fitting session where a hearing care professional (HCP) adjusts the hearing aid to the liking of the wearer of the hearing aid.

Good settings are desired as less than optimal settings may result in poor performance of the hearing aid and subsequently a bad experience for the hearing aid wearer.

The arrangement of the hearing aid in and/or at the ear of the wearer of the hearing aid will influence the performance of the hearing aid.

Thus, for the hearing aid to have the best possible performance, the hearing aid should be arranged correctly in and/or at the ear of the hearing aid wearer. This presents a challenge for the wearer of the hearing aid because it is difficult to achieve a correct arrangement of the hearing aid in and/or at the ear of the wearer himself/herself without any assistance to guide the wearer. This is particularly so for new users, who are inexperienced in arranging their hearing aid correctly. It is a problem that some hearing aid wearers experience bad performance of the hearing aid, where the bad performance is not due to the performance of the hearing aid components as such but due to an incorrect arrangement of the hearing aid in and/or at the ear of the wearer.

It is often crucial for a Hearing Care Professional (HCP) to assess the wearer's hearing aid insertion in a live video call during a tele-audiology session. This would be a trivial task in-person when the HCP can get close to the hearing aid wearer and observe and/or physically manipulate the hearing aid. However, during a live video call this is considerably more difficult, as the HCP may need to ask the wearer to reposition their phone or laptop and/or their head so that a camera can capture the insertion of the hearing aid. This can be time consuming, inconvenient and uncomfortable for the hearing aid wearer.

There is a need for providing assistance in correctly arranging a hearing aid in and/or at an ear of a wearer of the hearing aid.

SUMMARY

Disclosed is an application. The application is to be executed by a first electronic device. The first electronic device comprises a camera. The first electronic device comprises a display. The application is for assisting in correctly arranging a hearing aid in and/or at an ear of a wearer of the hearing aid. The application is configured for providing access to a camera application associated with the camera of the first electronic device. The application is configured for enabling a viewfinder of the camera application to display a preview of the field-of-view of the camera. The application is configured for determining if the wearer's head is aligned with the camera. The application is configured for determining if the wearer's head has begun to rotate relative to the camera. The application is configured for initiating a capture sequence capturing a plurality of images. The plurality of images shows at least part of the ear of the wearer with the hearing aid arranged in and/or at the ear as the wearer's head rotates.

It is an advantage that assistance for correctly arranging the hearing aid in and/or at the ear of the wearer of the hearing aid is provided. Thus, acoustic feedback, physical discomfort, inaccurate gain, and other issues due to lack of proper insertion of the hearing aid in and/or at the ear may be eliminated or at least reduced. It is an advantage that the hearing aid wearer themselves or a Hearing Care Professional (HCP) may be able to perform a visual evaluation to help identify poor insertion or arrangement of the hearing aid in and/or at the ear of the wearer of the hearing aid. It is an advantage that the insertion or placement of the hearing aid in and/or at the ear of the wearer of the hearing aid may be shown at multiple angles around the ear, thereby providing improved context for the visual evaluation and further providing improved evaluation of the placement of all component of the hearing aid.

It is an advantage that the application allows a user, hearing aid wearer, or HCP to manually evaluate the images based on multiple angles of capture, and therefore the evaluation can be performed with more certainty, e.g. in contrast to prior art applications where only a single image was used for evaluation of the placement of the hearing air in the ear.

It is an advantage that the application is configured for determining if the wearer's head is aligned with the camera because this may provide that the wearer's head may be centered in the plurality of images, such as at least more centered compared to if the wearer's head is not aligned with the camera. It is an advantage that the application is configured for determining if the wearer's head has begun to rotate relative to the camera, and that the application is configured for initiating the capture sequence capturing the plurality of images, because this may provide that the plurality of images may capture the wearer's head as the head is rotating relative to the camera.

The application or app or application program or software application may be a computer program or computer software designed to be executed by the first electronic device. The application may be designed or configured to provide functionalities for assisting in correctly arranging a hearing aid in and/or at an ear of a wearer of the hearing aid. The wearer of the hearing aid may be the user of the application and the words "wearer" and "user" may be used interchangeably in this regard. The application may be available in versions for different platforms or operating systems, e.g. Android (Google) or iOS (Apple). The application may be installed on the first electronic device by various means. For example, the application may be downloaded onto the first electronic device from an application distribution platform that is operated by an owner of an operating system, such as the App Store (iOS/Apple) or Google Play Store (Android/Google). The application may be a stand-alone application with the sole purpose to assist in correctly arranging a hearing aid in and/or at an ear of a wearer of the hearing aid. Alternatively, the application may provide additional functionalities, such as adjustment of hearing parameters or modes, which may be related to the sound or audio of hearing aid. A user of the application may go through all of the functionalities as described below, or the user may choose to use just one functionality of the application.

The application is configured to be executed by the first electronic device. The first electronic device may be the hearing aid wearer's smart phone, tablet, or pc. The first electronic device may communicate with the hearing aid via a wire or via a wireless connection, for example Bluetooth (BT), Wi-Fi, WLAN or any other wireless communication technology standards as known to a person skilled in the art for exchanging data over short distances. The first electronic device may comprise the necessary hardware to be able to execute the disclosed application, including, but not limited to, one or more processing units, sufficient memory capacity and/or storage capacity.

The first electronic device comprises a camera. The camera may be configured for providing a camera and/or video stream, such as a continuous camera and/or video stream. In this regard an image may be regarded as a single static representation captured at a specific point in time, while a camera and/or video stream may be regarded as a continuous sequence of images. In other words, an image may be considered as a single video frame, whereas a video may be the display of multiple consecutive video frames. In some embodiments, the camera is a front-facing camera and/or a back-facing camera.

The camera may be any kind of camera provided in an electronic device, such as any kind of built-in or add-on peripheral camera of an electronic device. The camera may comprise one or more cameras, such as a front or front-facing camera and/or a rear or rear-facing camera. The camera may be a digital camera, a Red Green Blue (RGB) camera, an Infra-red (IR) camera, a structured light scanner camera, a depth camera, a time of flight camera, and/or the camera may be a camera providing any kind of three-dimensional (3D) scanning or sensing technology. The camera may comprise one or more sensors and/or detectors, such as Complementary metal-oxide-semiconductor (CMOS) image sensors, such as charge-coupled-device (CCD) image sensor. The camera may comprise a lens, such as a double Gauss lens, such as a Cooke triplet lens, such as a moulded plastic aspheric lens element. The camera may provide any kind of effect, such as different optical effects, such as distortion, such as vignetting, and/or such as various optical aberration corrections. The camera may have one or more zoom features, such as a digital zoom feature and/or an optical zoom feature. A structured light scanner camera may perform a measurement of the three-dimensional shape of an object, e.g. of the hearing aid, and/or ear, and/or face, and/or head of the wearer, using projected light patterns and a camera system. A light source from a scanner head may project a series of light patterns onto the object, which are then captured by the camera and sent to a 3D scanning software for processing, whereby a 3D image of the object may be provided.

The first electronic device comprises a display. The display may comprise a screen. The display may be an Organic Light-Emitting Diode (OLED) display. The display may be a Liquid Crystal Display (LCD). The display may comprise touchscreen capabilities allowing user interaction directly with the screen. The display may be a touchscreen or a touch-sensitive screen.

The application is for assisting in correctly arranging or inserting a hearing aid in and/or at an ear of a wearer of the hearing aid. Correctly arranging the hearing aid in and/or at the ear may be crucial to ensure optimal performance of the hearing aid and/or comfort for the wearer. Correct arrangement of the hearing aid may vary slightly depending on the type of hearing aid and the specific design. Furthermore, correct arrangement may also vary on the anatomy of the wearer and the shape of the wearer's ear.

The application is configured for providing access to a camera application associated with the camera of the first electronic device. The camera application or camera app may be a software application designed for capturing, editing and managing images and videos using the camera. The camera application comprises a viewfinder. The viewfinder may be the interface though which users frame and compose a photo or a video before capture. The viewfinder may comprise several features such as focus, zoom and/or flash controls or affordances. The viewfinder is configured to display a preview of the field-of-view of the camera. The preview may allow a user to see what is about to be captured by the camera before the image is captured. Thus, in other words, "a preview" or "a preview of the field-of-view of the camera" refers to an image that has not yet been captured. The application is configured for enabling a viewfinder of the camera application to display, on the display, a preview of the field-of-view of the camera.

The application is configured for determining if the wearer's head is aligned with the camera. Thus, the application may be configured for determining if the wearer's head is at a same or similar height as the camera. In other words, the application may be configured for determining if the wearer's head is in a correct position, in relation to the camera, for the camera to capture the wearer's head in an image or a preview. Determining if the wearer's head is aligned with the camera should not be considered limiting in regards to the orientation of the head relative to the camera. For example, the wearer may have the face facing the camera. Alternatively, another part of the wearer's head, such as the side of the head and one of the ears may be facing the camera.

The application is configured for determining if the wearer's head has begun to rotate relative to the camera. In this regard, rotating the head relative to the camera may comprise pitch, roll and/or yaw or any combination of these. The application may be configured for determining if the wearer's head has begun rotating to the left side or the right side. Additionally, or alternatively, the application may be configured for determining is the wearer's head has begun rotating up or down. Additionally, or alternatively, the application may be configured for determining is the wearer's head has begun tilting. Rotating the head relative to the camera may comprise moving the head relative to the first electronic device. Additionally, or alternatively, rotating the head relative to the camera may comprise moving the first electronic device relative to the head. Thus, in case the wearer cannot turn their head, the camera may be moved relative to the head.

The application is configured for initiating a capture sequence capturing a plurality of images. In this regard an image may refer to a visual representation of what is captured by the camera. The plurality of images comprises more than one image. Initiating the capture sequence may commence with capturing a first image of the plurality of images. Subsequently, a second image of the plurality of images may be captured and so on until a desired amount or number of images may be comprised in the plurality of images. The plurality of images may be multiple images, a collection of images or a group of images. The plurality of images may be a first plurality of images. If one or more images are removed from the plurality of images, the plurality of images may be a second plurality of images. The camera may be configured for providing the plurality of images as part of a camera and/or video stream, such as a continuous camera and/or video stream. The plurality of images may be consecutive images in the camera and/or video stream provided by the camera. The plurality of images may be a selection of images in the camera and/or video stream provided by the camera, the selection corresponding to the extent of the capture sequence. The plurality of images may be digital images in formats such as Joint Photographic Experts Group (JPEG), Portable Network Graphics (PNG) or RAW. The plurality of images may be configured to be displayed, stored and/or shared electronically. The plurality of images may be a first plurality of images.

The plurality of images shows at least the ear or at least part of the ear of the wearer with the hearing aid arranged in and/or at the ear as the wearer's head rotates. Thus, in other words, the plurality of images may provide a video showing multiple angle views of the ear or a variation of viewing angles of the ear.

According to an aspect, disclosed is a system for assisting in correctly arranging a hearing aid in and/or at an ear of a wearer of the hearing aid. The system comprises the application as disclosed, said application is to be executed by the first electronic device. In this regard, the application may be referred to as a first application. The first electronic device comprises the camera. The system comprises a second application. The second application may be similar or identical to the first application in terms of functionalities and capabilities. However, the second application is different from the first application. The second application is to be executed by a second electronic device. The first electronic device and the second electronic device are configured for providing a tele-audiology session between the wearer of the hearing aid and a Hearing Care Professional (HCP). The second electronic device may be similar or identical to the first electronic device in terms of functionalities and capabilities, but the second electronic device is different from the first electronic device. The term "tele-audiology" typically refers to the use of telecommunication technologies to provide audiological services remotely. Tele-audiology may be beneficial in situations where physical distance, travel constraints, or other factors make it challenging for hearing aid users to access traditional audiological services. During the tele-audiology session, the HCP may perform an assessment of the arrangement of the hearing aid in and/or at an ear of the wearer of the hearing aid. Additionally, the HCP may also perform various fittings and adjustments. The tele-audiology session may comprise asynchronous tests and/or synchronous tests. It is an advantage that the system for assisting in correctly arranging the hearing aid in and/or at the ear of the wearer of the hearing aid is provided as the system provides the advantages as disclosed for the first application as well as enabling the HCP to further assist, review and provide hearing care based on the results or output or features provided by the first application. Thus, the system as disclosed may provide improved and efficient service delivery during the tele-audiology session and may improve the level of audiological care.

In some embodiments, the capture sequence is automatically initiated. In some embodiments, the capture sequence is automatically initiated upon determining that the wearer's head has begun to rotate relative to the camera. The determination that the wearer's head has begun to rotate relative to the camera may be provided using computer vision technology. The computer vision technology may comprise an ear-tracking algorithm and/or face-tracking algorithm, and/or a head-tracking algorithm, and/or an object-tracking algorithm. The computer vision technology may be applied on the camera and/or video stream provided by the camera. Additionally, or alternatively, the computer vision technology may be applied on a data stream from a 3D depth sensor comprised by the first electronic device. It is an advantage that the capture sequence may be automatically initiated, such as automatically initiated upon determining that the wearer's head has begun to rotate relative to the camera, because this may provide that the plurality of images is captured during more stable capture conditions compared to if the capture sequence is initiated by user input.

In some embodiments, the capture sequence is automatically initiated upon determining that the wearer's head has begun to rotate past an angle threshold relative to the camera. The angle threshold may correspond to capturing the front of the ear, such as the angle threshold being a value between 5-85 degrees, such as 15-75 degrees, such as 25-65 degrees, such as 35-55 degrees, such as 40-50 degrees and such as 45 degrees. Alternatively, and/or additionally, the angle threshold may correspond to capturing the back of the ear, such as the angle threshold being a value between 90-180 degrees, such as 100-170 degrees, such as 110-160 degrees, such as 120-150 degrees, such as 130-140 degrees and such as 135 degrees. In this regard, the starting point for measuring or determining the angle rotation of the head relative to the camera may be the position of the head at the time of determining if the wearer's head is aligned with the camera. It is an advantage that the capture sequence may be automatically initiated upon determining that the wearer's head has begun to rotate past an angle threshold relative to the camera because this may provide improved image quality of the plurality of images and may further provide that the plurality of images shows the desired angle views or viewing angles of the ear.

In some embodiments, the application is further configured for determining if the wearer's ear is captured, or at least partly captured, by the camera. In some embodiments, the capture sequence is automatically initiated upon determining that the wearer's ear is captured, or at least partly captured, by the camera. In this regard, the ear may be considered captured, or at least partly captured, by the camera, when at least most of the ear is captured, such as when at least a percentage between 50%-100%, such as 60%-90%, such as 70%-80%, such as 75%, of the surface area of the ear is captured by the camera. It may be an advantage to at least capture the part close to the hearing aid cable in the middle, because this may provide an improved evaluation of the placement of the hearing aid in the ear. The determination that the wearer's ear is captured, or at least partly captured, by the camera may be provided using computer vision technology. The computer vision technology may comprise an ear-tracking algorithm and/or face-tracking algorithm. The computer vision technology may be applied on the camera and/or video stream provided by the camera. Additionally, or alternatively, the computer vision technology may be applied on a data stream from a 3D depth sensor comprised by the first electronic device. It is an advantage that the application may be configured for determining if the wearer's ear is captured by the camera because this may provide improved image quality of the plurality of images. It is an advantage that the capture sequence may be automatically initiated upon determining that the wearer's ear is captured by the camera because this may provide improved image quality of the plurality of images and may further provide that the plurality of images shows the desired angle views or viewing angles of the ear.

In some embodiments, the first electronic device comprises one or more input devices. In some embodiments, the application is configured for providing a user interface. The user interface may be further configured for receiving user input. The user interface may comprise the display. Additionally, the user interface may comprise the one or more input devices. The one or more input devices may be comprised in the display, such as the display may comprise touchscreen capabilities allowing user interaction directly with the screen. The one or more input devices may be configured for receiving user input in the form of a finger of a hand gesture, such as for example a touch-screen, a keyboard and/or a fingerprint scanner. The one or more input devices may be separate from the display, such as for example a touch-screen separate from the display. The one or more input devices may be a button configured to be pressed or clicked. The one or more input devices may be configured for receiving user input in the form of a audio input, such as a voice input.

In some embodiments, the capture sequence is initiated upon receiving a user input. The user input may be provided via the user interface. The user input may be provided via the one or more input devices.

In some embodiments, the application is further configured for indicating to the wearer that the plurality of images has been captured. The plurality of images may be the first plurality of images or the second plurality of images. The application may be configured for visually indicating to the wearer that the plurality of images has been captured, such as visually indicating via the display. Additionally, or alternatively, the application may be configured for indicating to the wearer that the plurality of images has been captured using audio, tactile and/or haptic output. This may be an advantage because the wearer may not be able to see the display at this point in time. It is an advantage that audio, tactile and/or haptic output may complement the visual indicating, especially if the wearer is not able to see the display at this point in time. Indicating to the wearer that the plurality of images has been captured is an advantage because the wearer may then be informed that the capture has been completed and that the wearer may move the first electronic device and/or the head.

In some embodiments, the application is further configured for providing a first visual guide in the viewfinder, the first visual guide is for assisting the wearer in aligning his/her face with the camera. Additionally or alternatively, the application may be configured for providing guidance or feedback for assisting the wearer in aligning his/her face with the camera using audio, tactile and/or haptic output. The first visual guide and/or the guidance for assisting the wearer in aligning his/her face with the camera may be automatically provided or may be provided upon receiving user input. It is an advantage that the first visual guide may assist the wearer in aligning his/her face with the camera because this may provide that the head is at an appropriate height or level with the camera. It is an advantage that audio, e.g. speech, tactile and/or haptic output may be provided as guidance or feedback for assisting the wearer in aligning his/her face with the camera because this may provide that the head is at an appropriate height or level with the camera, especially if the wearer is not able to see the display at this point in time. It is an advantage that audio, tactile and/or haptic output may complement the first visual guide, especially if the wearer is not able to see the display at this point in time.

In some embodiments, the application is further configured for providing a second visual guide in the viewfinder, the second visual guide is for assisting the wearer in rotating his/her head relative to the camera. Additionally, the application may be configured for providing guidance or feedback for assisting the wearer in rotating his/her head relative to the camera using audio, tactile and/or haptic output. The second visual guide and/or the guidance for assisting the wearer in rotating his/her head relative to the camera may be automatically provided or may be provided upon receiving user input. It is an advantage that the second visual guide may assist the wearer in rotating his/her head relative to the camera because this may provide that the head is rotated relative to the camera at an appropriate timing with respect to capturing the plurality of images. It is an advantage that audio, e.g. speech, tactile and/or haptic output may be provided as guidance or feedback for assisting the wearer in rotating his/her head relative to the camera because this may provide that the head is rotated relative to the camera at an appropriate timing with respect to capturing the plurality of images, especially if the wearer is not able to see the display at this point in time. It is an advantage that audio, tactile and/or haptic output may complement the second visual guide, especially if the wearer is not able to see the display at this point in time.

In some embodiments, the application is further configured for defining a bounding area, the bounding area encompassing the ear or part of the ear of the wearer in the plurality of images. In some embodiments, the application is further configured for cropping the plurality of images according to the bounding area. Defining the bounding area and/or cropping the plurality of images according to the bounding area may be provided using computer vision technology. Defining the bounding area and/or cropping the plurality of images according to the bounding area may be automatically provided or may be provided upon receiving user input. The computer vision technology may comprise an ear-tracking algorithm and/or face-tracking algorithm. The computer vision technology may be applied on the camera and/or video stream provided by the camera. Additionally, or alternatively, the computer vision technology may be applied on a data stream from a 3D depth sensor comprised by the first electronic device. The bounding area may have a shape, such as a geometric shape, such as a curved shape, e.g. a circle, or a polygon shape, e.g. a square. The plurality of images may be the first plurality of images or the second plurality of images. Defining the bounding area and cropping the plurality of images according to the bounding area is an advantage as it may provide a more stable position of the ear when the plurality of images is displayed and may further provide that ear may appear larger when the plurality of images is displayed. Thus, it may provide a more stable and coherent view of the ear.

In some embodiments, the application is further configured for determining a level of image quality in one or more of the images of the plurality of images. In some embodiments, the application is further configured for removing or deleting a specific image from the plurality of images if the level of image quality of the specific image is below a quality threshold. Determining the level of image quality and/or removing a specific image from the plurality of images may be automatically provided or may be provided upon receiving user input. The plurality of images may be the first plurality of images or the second plurality of images. The level of image quality may be related to various parameters, such as resolution, sharpness, contrast, saturation, blur and/or distortion, etc. The determination of the level of image quality may be provided using computer vision technology.

In some embodiments, the application is further configured for determining a level of similarity between each one of the images of the plurality of images and the subsequent image in the plurality of images. In some embodiments, the application is further configured for removing or deleting a specific image from the plurality of images if the level of similarity is above a similarity threshold, such as removing the specific image from the plurality of images if the level of similarity is above the similarity threshold for that specific image. Determining a level of similarity between each one of the images of the plurality of images and the subsequent image in the plurality of images and/or removing a specific image from the plurality of images may be automatically provided or may be provided upon receiving user input. The plurality of images may be the first plurality of images or the second plurality of images. The determination of the level of similarity between each one of the images of the plurality of images and the subsequent image in the plurality of images may be provided using computer vision technology. The determination of the level of similarity between each one of the images of the plurality of images and the subsequent image in the plurality of images may be provided by means of pixel values, voxel values, color values, intensity values etc. The similarity between images may be measured by comparing the histograms of two images, such as the histogram intersection and histogram correlation metrics may be used for this purpose.

In some embodiments, the application is further configured for providing feedback or output if the wearer rotates and/or moves his/her head and/or ear at a rotation speed above or below a threshold and/or outside a predefined position or area. In other words, the application may be configured for providing feedback if the user moves the head and/or ear in a manner that reduces the level of image quality. This is an advantage because it may provide that poor image quality is prevented, or at least partly prevented. The feedback may be may be automatically provided or may be provided upon receiving user input. The feedback may be visual output. Additionally, or alternatively, the feedback may be audio, tactile and/or haptic output. This is an advantage because the audio, tactile and/or haptic output may complement the visual output, especially if the wearer is not able to see the display at this point in time.

In some embodiments, the application is further configured for determining a representative image for the plurality of images. In some embodiments, the application is further configured for displaying the representative image on the display and/or in the user interface as a default image. The representative image may be an image that represents the plurality of images. Determining the representative image and/or displaying the representative image may be automatically provided or may be provided upon receiving user input. The plurality of images may be the first plurality of images or the second plurality of images. The determination of the representative image may be arbitrarily or deliberately. The representative image may be any one image in the plurality of images. For example, the representative image may be a median numbered image in the plurality of images. For example, the representative image may be an image that is in focus and/or free from motion-induced blurriness and/or showing the ear in the center of the image. The determination of the representative image may be performed using computer vision technology. It is an advantage that the representative image may aid the visual evaluation to help identify poor insertion or placement of the hearing aid in and/or at the ear of the wearer of the hearing aid.

In some embodiments, the application is further configured for determining one or more rotation angle images, the one or more rotation angle images showing the wearer rotating the head relative to the camera, such as at an angle between 30-90 degrees, such as 40-80 degrees, such as 50-70 degrees, such as 60 degrees. In some embodiments, the application is further configured for displaying the one or more rotation angles images on the display and/or in the user interface. Determining the one or more rotation angle images and/or displaying the one or more rotation angle images may be automatically provided or may be provided upon receiving user input. In some embodiments, the application is further configured for displaying one or more affordances in the user interface. In some embodiments, the application is further configured for, in response to a user selection of the one or more affordances via the one or more input devices, displaying the one or more rotation angle images, respectively. The one or more affordances may be one or more user selectable objects in the user interface, such as buttons, icons or sliders. The one or more affordances may provide short cuts to the disclosed functionalities of the application. It is an advantage that the one or more rotation angle images may aid the visual evaluation to help identify poor insertion or placement of the hearing aid in and/or at the ear of the wearer of the hearing aid.

In some embodiments, the application is further configured for detecting a first type of gesture via the one or more input devices. In some embodiments, the application is further configured for, in response to detecting the first type of gesture, displaying the plurality of images as a video, such as displaying a continuous sequence of images in the plurality of images, or displaying each image individually, such as each one image individually in the plurality of images, on the display and/or in the user interface. The plurality of images may be the first plurality of images or the second plurality of images. The first type of gesture may be a user input. The first type of gesture may be a tap gesture on the one or more input devices, such as a tap gesture on a touchscreen. Tap gestures may be described as gestures where one or more fingers touch the one or more input devices briefly. Thus, the fingers involved in tap gestures should typically not move significantly from the initial touch points. The first type of gestures being a tap gesture may be a single tap, a double tap, or a triple tap, etc. The first type of gesture may also be a “click” gesture if the one or more input devices are a pointer-based device such as a mouse. It is an advantage that the user via the first type of gesture may select how to review the plurality of images because this may aid the visual evaluation to help identify poor insertion or placement of the hearing aid in and/or at the ear of the wearer of the hearing aid.

In some embodiments, the application is further configured for detecting a second type of gesture via the one or more input devices. In some embodiments, the application is further configured for, in response to detecting the second type of gesture, displaying the plurality of images on the display and/or in the user interface by shifting through or navigating through or browsing through or scrolling through the plurality of images. In some embodiments, the shifting through the plurality of images depends on and/or is proportional with the orientation and/or the magnitude of the second type of gesture. The plurality of images may be the first plurality of images or the second plurality of images. The second type of gesture may be a user input. The second type of gesture may be a drag, scrub, pan, swipe or pin gesture. The second gesture may be a continued gesture involving one or more fingers, where the one or more fingers involved in the second type of gesture may move from one or more initial touch points, respectively, in the one or more input devices. It is an advantage that the user via the second type of gesture may select how to review the plurality of images because this may aid the visual evaluation to help identify poor insertion or placement of the hearing aid in and/or at the ear of the wearer of the hearing aid.

In some embodiments, the plurality of images is stitched together to produce or provide a three-dimensional (3D) image. In some embodiments, the application is further configured for displaying the 3D image on the display and/or in the user interface. The 3D image and/or the display of the 3D image may be automatically provided or may be provided upon receiving user input. The plurality of images may be the first plurality of images or the second plurality of images. The 3D image may be provided by stitching the plurality of images together via one or more algorithms to match common features in the plurality of images and then blend the plurality of images together to create a seamless panorama 3D image. The 3D images may provide a perception of depth along the three spatial dimensions: width, height, and depth. The 3D image may be provided using computer vision technology, computer-generated graphics (CGI). It is an advantage that a 3D image may be provided as this may provide a more realistic visual display of the ear and may allow the user to view the ear from more than one angle.

In some embodiments, the camera is a digital camera, and/or an infrared camera, and/or a structured light scanner camera and/or a time of flight sensor providing 2D images and/or 3D images.

In some embodiments, the camera is a front-facing camera and/or a back-facing camera.

In some embodiments, the first electronic device further comprises a three-dimensional (3D) depth sensor. The three-dimensional (3D) depth sensor may be configured for providing a data stream, such as a continuous data stream. The 3D depth sensor may be configured for measuring a distance between the sensor and the wearer and/or the ear and provide depth information for the application. The 3D depth sensor may use infrared light patterns, time-of-flight or any other technologies known to the skilled person to achieve the depth information.

In some embodiment, the first electronic device further comprises one or more output device. The one or more output device may be configured for providing audio, tactile and/or haptic output. The one or more output devices may comprise one or more speakers. The one or more output devices may comprise one or more vibration motors.

In some embodiments, the tele-audiology session comprises a live video call between the first electronic device and second electronic device. In some embodiments, the plurality of images is captured during the live video call. In some embodiments, the plurality of images is transmitted from the first electronic device to the second electronic device. In some embodiments, the plurality of images is transmitted to the second electronic device during the tele-audiology session. In some embodiments, the plurality of images is transmitted to the second electronic device prior to tele-audiology session. The plurality of images may be transmitted using an online service over the internet, such as a cloud service. The first electronic device may be configured for communicating with the second electronic device via a wire or via a wireless connection, for example Bluetooth (BT), Wi-Fi, WLAN, or any other wireless communication technology standards known to the skilled person. The first electronic device may be configured for communicating with the second electronic device using various communication technologies and protocols, for example internet-based communication, such as conferencing apps, and/or cellular networks, such as 3G, 4G/LTE and/or 5G. The plurality of images may be the first plurality of images or the second plurality of images. It is an advantage that the plurality of images may be transmitted to the second device prior to or during the tele-audiology session because this may provide that the HCP may have access to the plurality of images and may use the plurality of images to improve the hearing care service provided. It is an advantage that the tele-audiology session may comprise a live video call between the first electronic device and second electronic device because this may provide a real-time interaction between the hearing aid wearer and the HCP. This is an advantage as the assisting in correctly arranging the hearing aid in and/or at the ear of the wearer may be an iterative process and/or that the HCP may accelerate, enhance and/provide input to the process of the assisting in correctly arranging the hearing aid in and/or at the ear of the wearer. It is an advantage that the plurality of images may be captured during the live video call, because this provides the possibility for the HCP to review the arrangement of the hearing aid real-time from multiple angles around the ear.

In an embodiment, a hearing aid is configured to be worn by a user. The hearing aid may be arranged at the user's ear, on the user's ear, over the user's ear, in the user's ear, in the user's ear canal, behind the user's ear and/or in the user's concha, i.e., the hearing aid is configured to be worn in, on, over and/or at the user's ear. The user may wear two hearing aids, one hearing aid at each ear. The two hearing aids may be connected, such as wirelessly connected and/or connected by wires, such as a binaural hearing aid system.

The hearing aid may be a personal sound amplification product (PSAP), an over-the-counter (OTC) hearing aid, a one-size-fits-all hearing aid or a custom hearing aid. Hearing aids can include both prescription devices and non-prescription devices.

The hearing aid may be embodied in various housing styles or form factors. Some of these form factors are Behind-the-Ear (BTE) hearing aid, Receiver-in-Canal (RIC) hearing aid, Receiver-in-Ear (RIE) hearing aid or Microphone-and-Receiver-in-Ear (MaRIE) hearing aid. These aids may comprise a BTE unit configured to be worn behind the ear of the user and an in the ear (ITE) unit configured to be inserted partly or fully into the user's ear canal. Generally, the BTE unit may comprise at least one input transducer, a power source and a processing unit. The term BTE hearing aid refers to a hearing aid where the receiver, i.e. the output transducer, is comprised in the BTE unit and sound is guided to the ITE unit via a sound tube connecting the BTE and ITE units, whereas the terms RIE, RIC and MaRIE hearing aids refer to hearing aids where the receiver may be comprise in the ITE unit, which is coupled to the BTE unit via a connector cable or wire configured for transferring electric signals between the BTE and ITE units.

Some of these form factors are In-the-Ear (ITE) hearing aid, Completely-in-Canal (CIC) hearing aid or Invisible-in-Canal (IIC) hearing aid. These hearing aids may comprise an ITE unit, wherein the ITE unit may comprise at least one input transducer, a power source, a processing unit and an output transducer. These form factors may be custom aids, meaning that the ITE unit may comprise a housing having a shell made from a hard material, such as a hard polymer or metal, or a soft material such as a rubber-like polymer, molded to have an outer shape conforming to the shape of the specific user's ear canal.

Some of these form factors are earbuds, on the ear headphones or over the ear headphones. The person skilled in the art is well aware of different kinds of hearing aids and of different options for arranging the hearing aid in, on, over and/or at the ear of the hearing aid wearer. The hearing aid (or pair of hearing aids) may be custom fitted, standard fitted, open fitted and/or occlusive fitted.

In an embodiment, the hearing aid may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the hearing aid may comprise one or more antenna(s) configured for wireless communication. The one or more antenna(s) may comprise an electric antenna. The electric antenna may be configured for wireless communication at a first frequency. The first frequency may be above 800 MHz, such as a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the hearing aid may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing aid may be configured for wired/wireless audio communication, e.g. enabling the user to listen to media, such as music or radio and/or enabling the user to perform phone calls.

In an embodiment, the wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another hearing aid, e.g., as part of a binaural hearing system and/or from one or more accessory device(s), such as a smartphone and/or a smart watch.

In an embodiment, the hearing aid may include a processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

In an embodiment, the hearing aid may comprise an output transducer. The output transducer may be coupled to the processing unit. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the processing unit via the magnetic antenna. The output transducer may be comprised in an ITE unit or in an earpiece, e.g. Receiver-in-Ear (RIE) unit or Microphone-and-Receiver-in-Ear (MaRIE) unit, of the hearing aid. One or more of the input transducer(s) may be comprised in an ITE unit or in an earpiece.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

In an embodiment, the hearing aid may comprise a digital-to-analogue converter configured to convert the first electric output signal, the second electric output signal and/or the wireless output signal into an analogue signal.

In an embodiment, the hearing aid may comprise a vent. A vent is a physical passageway such as a canal or tube primarily placed to offer pressure equalization across a housing placed in the ear such as an ITE hearing aid, an ITE unit of a BTE hearing aid, a CIC hearing aid, a RIE hearing aid, a RIC hearing aid, a MaRIE hearing aid or a dome tip/earmold. The vent may be a pressure vent with a small cross section area, which may be acoustically sealed. The vent may be an acoustic vent configured for occlusion cancellation. The vent may be an active vent enabling opening or closing of the vent during use of the hearing aid. The active vent may comprise a valve.

In an embodiment, the hearing aid may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the hearing aid may comprise a memory, including volatile and non-volatile forms of memory.

The present disclosure relates to different aspects including the application and the system described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which:

FIG. 5 schematically illustrates an exemplary application configured for detecting a second type of gesture for displaying the plurality of images in the user interface.

FIG. 6 schematically illustrates a system for assisting in correctly arranging a hearing aid in and/or at an ear of a wearer of the hearing aid, the system comprising applications configured for providing a tele-audiology session.

DETAILED DESCRIPTION

Figure 1:
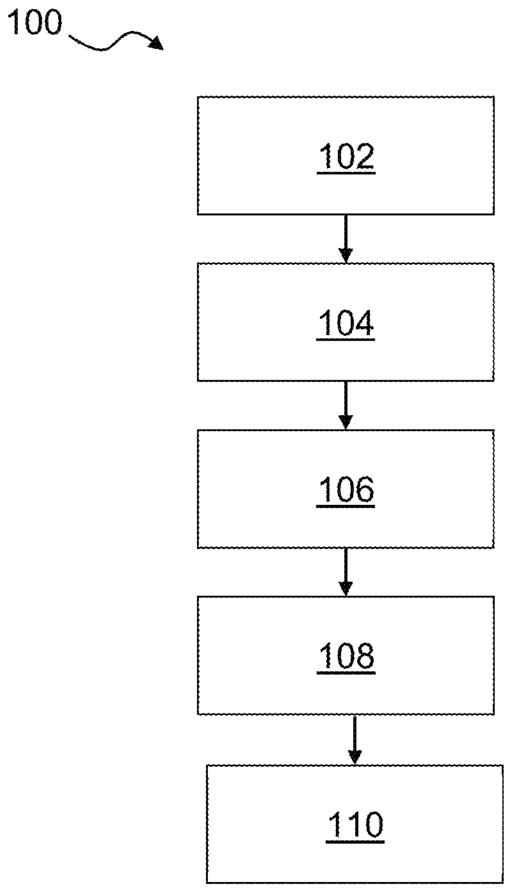
FIG. 1 illustrates a flowchart of an exemplary application.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a flowchart of an exemplary application 100. The application 100 is to be executed by a first electronic device. The first electronic device comprises a camera. The first electronic device comprises a display. The application 100 is for assisting in correctly arranging a hearing aid in and/or at an ear of a wearer of the hearing aid. The application 100 is configured for providing 102 access to a camera application associated with the camera of the first electronic device. The application 100 is configured for enabling 104 a viewfinder of the camera application to display a preview of the field-of-view of the camera. The application 100 is configured for determining 106 if the wearer's head is aligned with the camera. The application 100 is configured for determining 108 if the wearer's head has begun to rotate relative to the camera. The application 100 is configured for initiating 110 a capture sequence capturing a plurality of images. The plurality of images shows at least part of the ear of the wearer with the hearing aid arranged in and/or at the ear as the wearer's head rotates.

Figure 2:
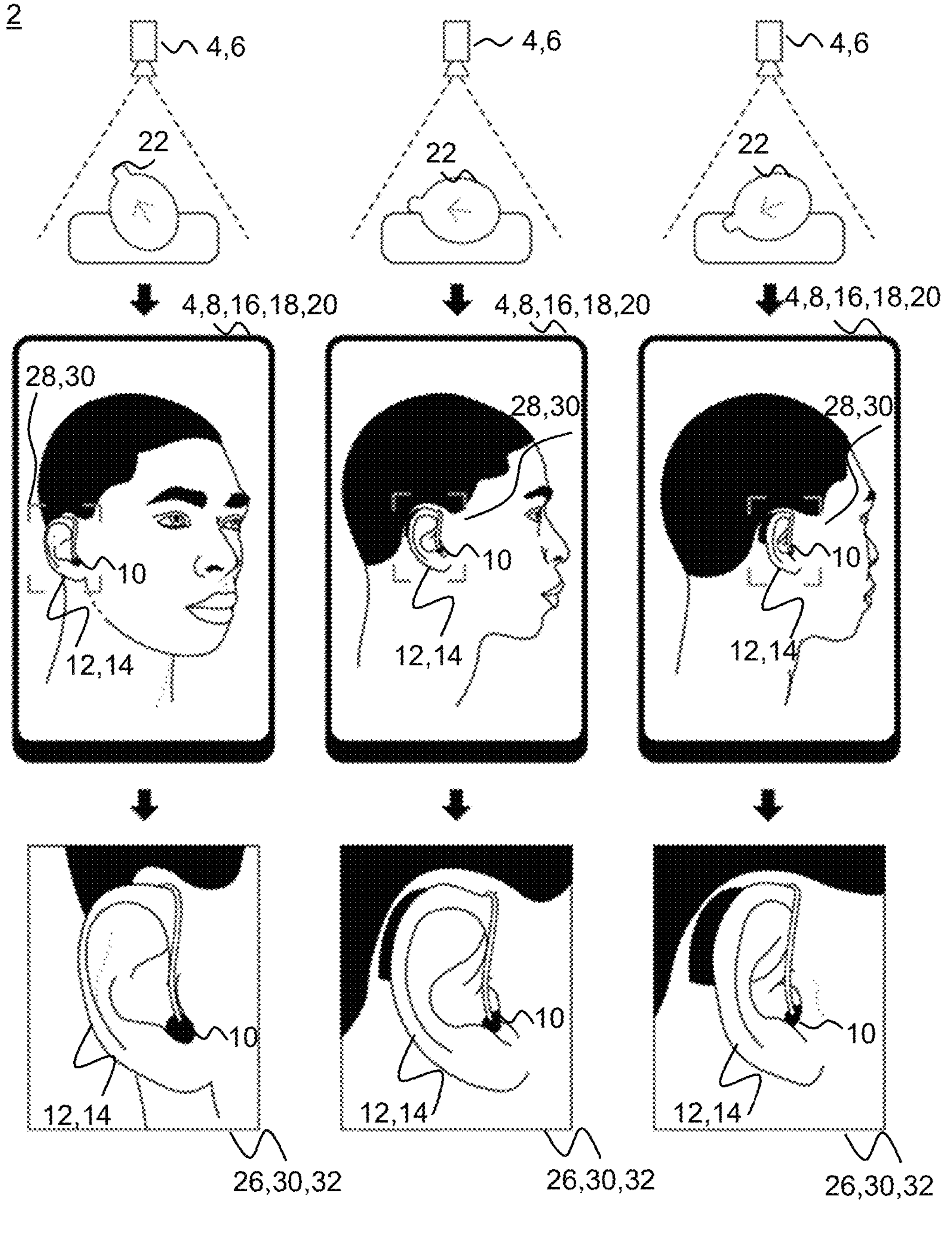
FIG. 2 schematically illustrates an exemplary application to be executed by a first electronic device.

FIG. 2 schematically illustrates an exemplary application 2 to be executed by a first electronic device 4. The first electronic device 4 comprises a camera 6. The first electronic device 4 comprises a display 8. The application 2 is for assisting in correctly arranging a hearing aid 10 in and/or at an ear 12 of a wearer 14 of the hearing aid. The application 2 is configured for providing access to a camera application 16 associated with the camera 6 of the first electronic device 4. The application 2 is configured for enabling a viewfinder 18 of the camera application 16 to display a preview 20 of the field-of-view of the camera 6. The application 2 is configured for determining if the wearer's head 22 is aligned with the camera 6. The application 2 is configured for determining if the wearer's head 22 has begun to rotate relative to the camera 6. The application 2 is configured for initiating a capture sequence 24 capturing a plurality of images 26. The plurality of images 26 shows at least part of the ear 12 of the wearer 14 with the hearing aid 10 arranged in and/or at the ear 12 as the wearer's head 22 rotates.

The application 2 is further configured for providing a second visual guide 28 in the viewfinder 18, the second visual guide 28 is for assisting the wearer 14 in rotating his/her head 22 relative to the camera 6.

The application 2 is further configured for defining a bounding area 30, the bounding area 30 encompassing the ear 12 or part of the ear 12 of the wearer 14 in the plurality of images 26, and cropping the plurality of images 26 according to the bounding area 30. The bounding area 30 may have a shape, such as a geometric shape, such as a curved shape, e.g. a circle, or a polygon shape, e.g. a square.

The application 2 is further configured for determining and displaying one or more rotation angle images 32, the one or more rotation angle images 32 showing the wearer's head 22 rotating relative to the camera 6, such as at 30 and/or 90 degrees angles.

Figure 3:
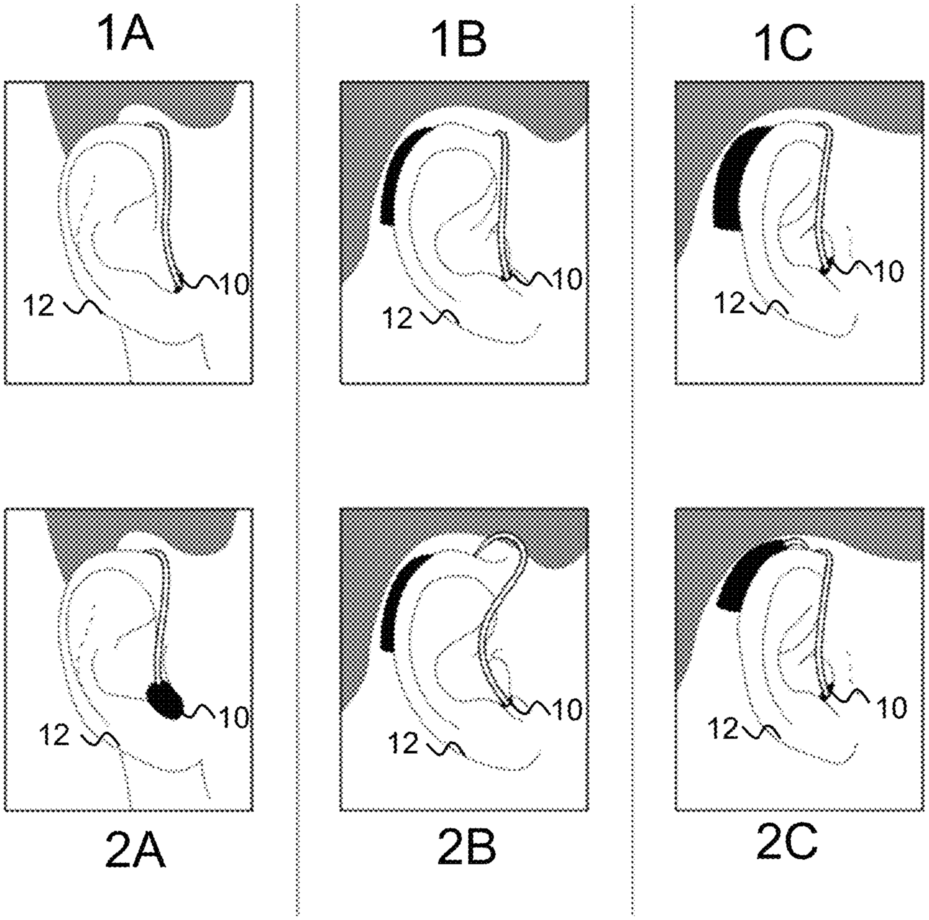
FIG. 3 schematically illustrates exemplary insertions of a hearing aid in and/or at an ear of a wearer of the hearing aid.

FIG. 3 schematically illustrates exemplary insertion and/or placement of a hearing aid 10 in and/or at an ear 12 of a wearer of the hearing aid. The first row shows examples (1A, 1B and 1C) of good insertion and/or placement of the hearing aid 10 in and/or at the ear 12 of the wearer of the hearing aid at three different angles around the ear. The second row shows examples (2A, 2B and 2C) of poor insertion and/or placement of the hearing aid 10 in and/or at the ear 12 of the wearer of the hearing aid at three different angles around the ear. 1A and 2A show the insertion from a front-side view, 1B and 2B show the insertion from a side view, and 1C and 2C show the placement from a back view.

Figure 4:
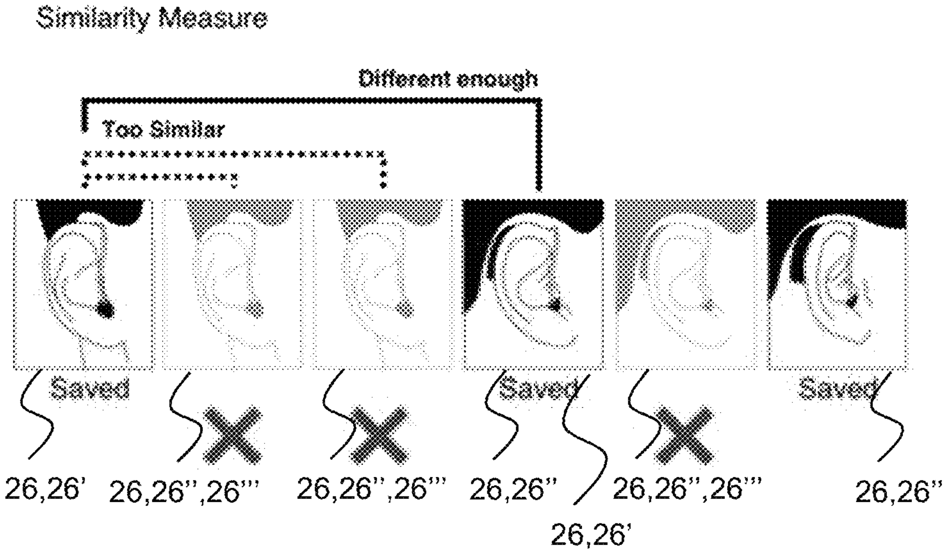
FIG. 4 schematically illustrates an exemplary application configured for determining a level of similarity between images.

FIG. 4 schematically illustrates an exemplary application to be executed by a first electronic device. The application is further configured for determining a level of similarity between each of the images 26' of the plurality of images 26 and the subsequent image 26" in the plurality of images 26 and removing a specific image 26'" from the plurality of images 26 if the level of similarity is above a similarity threshold.

FIG. 4 schematically illustrates that six images 26 are captured and compared with regards to determining a level of similarity. The first image, i.e. the image most to the left, is compared to the second and third images, and the second and third images are found too similar with the first images, and thus the second and third images are removed. The first image is then compared to the fourth image, and the first image and the fourth image are found to be different enough, and thus the fourth image is kept. The fifth image is found too similar with the fourth image, and thus the fifth image is removed. The fourth image is then compared to the sixth image, and the fourth image and the sixth image are found to be different enough, and thus the sixth image is kept.

FIG. 5 schematically illustrates an exemplary application 2 further configured for detecting a second type of gesture 34 via the one or more input devices and in response to detecting the second type of gesture 34, displaying the plurality of images 26 in the user interface 36 by shifting through the plurality of images 26 depending on the orientation and magnitude of the second type of gesture 34.

The second type of gesture 34 may be a user input 38. The second type of gesture 34 may be a drag, scrub, pan, swipe or pin gesture. The second type of gesture 34 may be a continued gesture involving one or more fingers 40, where the one or more fingers involved in the second type of gesture 34 may move from one or more initial touch points, respectively, in the one or more input devices.

FIG. 6 schematically illustrates a system 42 for assisting in correctly arranging a hearing aid in and/or at an ear of a wearer of the hearing aid, the system 42 comprising the application 2, to be executed by the first electronic device 4, and a second application 44 to be executed by a second electronic device 46. The first electronic device 4 and the second electronic device 46 are configured for providing a tele-audiology session between the wearer 14 of the hearing aid and a hearing care professional 48.

The plurality of images 26 may be transmitted to the second electronic device 46 prior to or during the tele-audiology session.

The tele-audiology session may comprise a live video call between the first electronic device 4 and the second electronic device 46 and wherein the plurality of images 26 may be captured during the live video call.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

ITEMS:

1. An application configured to be executed by a first electronic device, the first electronic device being configured for comprising a camera and a display, the application being for assisting in correctly arranging a hearing aid in and/or at an ear of a wearer of the hearing aid, the application being configured for:
   - providing access to a camera application associated with the camera of the first electronic device;
   - enabling a viewfinder of the camera application to display a preview of the field-of-view of the camera;
   - determining if the wearer's head is aligned with the camera;
   - determining if the wearer's head has begun to rotate relative to the camera;
   - initiating a capture sequence capturing a plurality of images, the plurality of images showing at least part of the ear of the wearer with the hearing aid arranged in and/or at the ear as the wearer's head rotates.
2. The application according to item 1, wherein the capture sequence is automatically initiated upon determining that the wearer's head has begun to rotate relative to the camera.
3. The application according to any one of the preceding items, wherein the capture sequence is automatically initiated upon determining that the wearer has begun to rotate the head past an angle threshold relative to the camera.
4. The application according to any one of the preceding items, wherein the application is further configured for determining if the wearer's ear is captured by the camera.
5. The application according to any one of the preceding items, wherein the capture sequence is automatically initiated upon determining that the wearer's ear is captured by the camera.
6. The application according to any one of the preceding items, wherein the first electronic device further comprises one or more input devices and wherein the application is further configured for providing a user interface.
7. The application according to any one of the preceding items, wherein the capture sequence is initiated upon receiving a user input.
8. The application according to any one of the preceding items, wherein the application is further configured for indicating to the wearer that the plurality of images has been captured.
9. The application according to any one of the preceding items, wherein the application is further configured for providing a first visual guide in the viewfinder, wherein the first visual guide is for assisting the wearer in aligning his/her face with the camera.
10. The application according to any one of the preceding items, wherein the application is further configured for providing a second visual guide in the viewfinder, the second visual guide is for assisting the wearer in rotating his/her head relative to the camera.
11. The application according to any one of the preceding items, wherein the application is further configured for defining a bounding area, the bounding area encompassing the ear or part of the ear of the wearer in the plurality of images, and cropping the plurality of images according to the bounding area.
12. The application according to any one of the preceding items, wherein the application is further configured for determining a level of image quality in one or more of the images of the plurality of images and removing a specific image from the plurality of images if the level of image quality of the specific image is below a quality threshold.
13. The application according to any one of the preceding items, wherein the application is further configured for determining a level of similarity between each of the images of the plurality of images and the subsequent image in the plurality of images and removing a specific image from the plurality of images if the level of similarity is above a similarity threshold.
14. The application according to any one of the preceding items, wherein the application is further configured for providing feedback if the wearer's head rotates and/or moves relative to the camera at a rotation speed above or below a threshold and/or outside a predefined position/area.
15. The application according to any one of the preceding items, wherein the application is further configured for determining a representative image for the plurality of images and displaying the representative image in the user interface as a default image.
16. The application according to any one of the preceding items, wherein the application is further configured for determining one or more rotation angle images, the one or more rotation angle images showing the wearer's head rotating relative to the camera, such as at 30 and/or 90 degrees angles; displaying one or more affordances in the user interface; and, in response to a user selection of the one or more affordances via the one or more input devices, displaying the one or more rotation angle images, respectively.

17. The application according to any one of the preceding items, wherein the application is further configured for detecting a first type of gesture via the one or more input devices and in response to detecting the first type of gesture, displaying the plurality of images as a video or displaying each image individually in the user interface.
18. The application according to any one of the preceding items, wherein the application is further configured for detecting a second type of gesture via the one or more input devices and in response to detecting the second type of gesture, displaying the plurality of images in the user interface by shifting through the plurality of images depending on the orientation and magnitude of the second type of gesture.
19. The application according to any one of the preceding items, wherein the plurality of images is stitched together to produce a composite 3D image.
20. The application according to any one of the preceding items, wherein the camera is a digital camera, and/or an infrared camera, and/or a structured light scanner camera and/or a time of flight sensor providing 2D images and/or 3D images.
21. The application according to any one of the preceding items, wherein the camera is a front-facing camera and/or a back-facing camera.
22. The application according to any one of the preceding items, wherein the first electronic device further comprises a 3D depth sensor, the 3D depth sensor is configured for providing a data stream.
23. A system for assisting in correctly arranging a hearing aid in and/or at an ear of a wearer of the hearing aid, the system comprising:
  - the application, according to any of the preceding claims, to be executed by the first electronic device comprising the camera;
  - a second application to be executed by a second electronic device;
  - wherein the first electronic device and the second electronic device are configured for providing a tele-audiology session between the wearer of the hearing aid and a hearing care professional.
24. The system according to item 23, wherein the plurality of images is transmitted to the second electronic device prior to or during the tele-audiology session.
25. The system according to any one of items 23-24, wherein the tele-audiology session comprises a live video call between the first and second electronic device and wherein the plurality of images are captured during the live video call.
26. An electronic device comprising:
  - a camera, a display, and a processing unit;
  - wherein the electronic device is configured to assist a wearer of a hearing aid to correctly arrange a hearing aid in and/or at an ear of the wearer of the hearing aid;
  - accessing the camera of the electronic device;
  - determining if a head of the wearer is aligned with the camera;
  - determining if the head of the wearer has begun to rotate relative to the camera; and
  - initiating a capture sequence capturing a plurality of images, the plurality of images showing at least a part of the ear of the wearer with the hearing aid arranged in and/or at the ear as the head of the wearer rotates.
  - enabling a camera application associated with the camera to provide a preview of the field-of-view of the camera;
27. The electronic device according to item 26, wherein the electronic device is configured to automatically initiate the capture sequence upon determining that the head of the wearer has begun to rotate relative to the camera.
28. The electronic device according to item 26, wherein the electronic device is configured to automatically initiate the capture sequence upon determining that the head of the wearer has rotated past an angle threshold relative to the camera.
29. The electronic device according to item 26, wherein the electronic device is configured to determine if the ear of the wearer is captured by the camera.
30. The electronic device according to item 26, wherein the electronic device is configured to automatically initiate the capture sequence upon determining that the ear of the wearer is captured by the camera.
31. The electronic device according to item 26, further comprising one or more input devices, and wherein the electronic device is configured to provide a user interface.
32. The electronic device according to item 26, wherein the electronic device is configured to automatically initiate the capture sequence upon receiving a user input.
33. The electronic device according to item 26, wherein the electronic device is configured to indicate to the wearer that the plurality of images has been captured.
34. The electronic device according to item 26, wherein the electronic device is configured to provide a first visual guide to assist the wearer in aligning his/her face with the camera.
35. The electronic device according to item 34, wherein the electronic device is configured to provide a second visual guide to assist the wearer in rotating the head of the wearer relative to the camera.
36. The electronic device according to item 26, wherein the electronic device is configured to define a bounding area, the bounding area encompassing the ear or a part of the ear of the wearer in the plurality of images, and wherein the electronic device is configured to crop the plurality of images based on the bounding area.
37. The electronic device according to item 26, wherein the electronic device is configured to determine a level of image quality of one of the images, and remove the one of the images from the plurality of images if the level of image quality of the one of the images is below a quality threshold.
38. The electronic device according to item 26, wherein the electronic device is configured to determine a level of similarity between one of the images in the plurality of images and a subsequent image in the plurality of images, and removing the subsequent image from the plurality of images if the level of similarity is above a similarity threshold.
39. The electronic device according to item 26, wherein the electronic device is configured to provide feedback if the head of the wearer rotates and/or moves relative to the camera at a rotation speed above or below a threshold and/or outside a predefined position/area.
40. The electronic device according to item 26, wherein the electronic device is configured to determine a representative image for the plurality of images, and provide the representative image via the display as a default image.

41. The electronic device according to item 26, wherein the electronic device is configured to:
determine one or more rotation angle images, the one or more rotation angle images showing the head of the wearer oriented relative to the camera; and
in response to a user selection of one or more affordances presented by the display, display the one or more rotation angle images, respectively.

42. The electronic device according to item 26, wherein the electronic device is configured to detect a first type of gesture via one or more input devices, and in response to detecting the first type of gesture, provide the images as a video or individually for presentation by the display.

43. The electronic device according to item 42, wherein the electronic device is configured to detect a second type of gesture via the one or more input devices, and in response to detecting the second type of gesture, provide the plurality of images for presentation via the display by shifting through the plurality of images depending on an orientation and a magnitude of the second type of gesture.

44. The electronic device according to item 26, wherein the electronic device is configured to produce a composite 3D image based on the plurality of images.

45. The electronic device according to item 26, wherein the camera is a digital camera, and/or an infrared camera, and/or a structured light scanner camera and/or a time of flight sensor providing 2D images and/or 3D images.

46. The electronic device according to item 26, wherein the camera is a front-facing camera and/or a back-facing camera.

47. The electronic device according to item 26, further comprising a 3D depth sensor, the 3D depth sensor configured to provide a data stream.

48. A system comprising the electronic device of item 26, and a second electronic device;
wherein the first electronic device and the second electronic device are configured to allow communication between the wearer of the hearing aid and a hearing care professional during a tele-audiology session.

49. The system according to item 48, wherein the plurality of images is transmitted to the second electronic device prior to or during the tele-audiology session.

60. The system according to item 48, wherein the tele-audiology session comprises a live video call between the first electronic device and the second electronic device, and wherein the plurality of images are captured during the live video call.

61. A method for assisting a wearer of a hearing aid to correctly arrange a hearing aid in and/or at an ear of the wearer, the method involving an electronic device comprising a camera and a display, the method comprising:
accessing the camera of the electronic device;
determining if a head of the wearer is aligned with the camera;
determining if the head of the wearer has begun to rotate relative to the camera; and
initiating a capture sequence capturing a plurality of images, the plurality of images showing at least a part of the ear of the wearer with the hearing aid arranged in and/or at the ear as the head of the wearer rotates.

62. The method according to item 61, wherein the capture sequence is initiated automatically upon determining that the head of the wearer has begun to rotate relative to the camera.

63. The method according to item 61, wherein the capture sequence is initiated automatically upon determining that the head of the wearer has rotated past an angle threshold relative to the camera.

64. The method according to item 61, further comprising determining if the ear of the wearer is captured by the camera.

65. The method according to item 61, wherein the capture sequence is initiated automatically upon determining that the ear of the wearer is captured by the camera.

66. The method according to item 61, further comprising providing a user interface.

67. The method according to item 61, wherein the capture sequence is initiated automatically upon receiving a user input.

68. The method according to item 61, further comprising providing an indication to the wearer that the plurality of images has been captured.

69. The method according to item 61, further comprising providing a first visual guide to assist the wearer in aligning his/her face with the camera.

70. The method according to item 69, further comprising providing a second visual guide to assist the wearer in rotating the head of the wearer relative to the camera.

71. The method according to item 61, further comprising:
defining a bounding area, the bounding area encompassing the ear or a part of the ear of the wearer in the plurality of images; and
cropping the plurality of images based on the bounding area.

72. The method according to item 61, further comprising:
determining a level of image quality of one of the images; and
removing the one of the images from the plurality of images if the level of image quality of the one of the images is below a quality threshold.

73. The method according to item 61, further comprising:
determining a level of similarity between one of the images in the plurality of images and a subsequent image in the plurality of images; and
removing the subsequent image from the plurality of images if the level of similarity is above a similarity threshold.

74. The method according to item 61, further comprising provide feedback if the head of the wearer rotates and/or moves relative to the camera at a rotation speed above or below a threshold and/or outside a predefined position/area.

75. The method according to item 61, further comprising:
determining a representative image for the plurality of images; and
provide the representative image via the display as a default image.

76. The method according to item 61, further comprising:
determining one or more rotation angle images, the one or more rotation angle images showing the head of the wearer oriented relative to the camera; and
in response to a user selection of one or more affordances presented by the display, displaying the one or more rotation angle images, respectively.

77. The method according to item 61, further comprising:
detecting a first type of gesture via one or more input devices; and
in response to detecting the first type of gesture, providing the images as a video or individually for presentation by the display.
78. The method according to item 77, further comprising:
detecting a second type of gesture via the one or more input devices; and
in response to detecting the second type of gesture, providing the plurality of images for presentation via the display by shifting through the plurality of images depending on an orientation and a magnitude of the second type of gesture.
79. The method according to item 61, further comprising producing a composite 3D image based on the plurality of images.
80. The method according to item 61, wherein the camera is a digital camera, and/or an infrared camera, and/or a structured light scanner camera and/or a time of flight sensor providing 2D images and/or 3D images.
81. The method according to item 61, wherein the camera is a front-facing camera and/or a back-facing camera.
82. The method according to item 61, wherein the electronic device comprises a 3D depth sensor, and wherein the method comprises providing a data stream by the 3D depth sensor.
83. The method according to item 61, wherein the first electronic device is configured to communicate with a second electronic device during a tele-audiology session.
84. The method according to item 83, wherein the plurality of images is transmitted to the second electronic device prior to or during the tele-audiology session.
85. The method according to item 83, wherein the tele-audiology session comprises a live video call between the first electronic device and the second electronic device, and wherein the plurality of images are captured during the live video call.
86. A processor-readable non-transitory medium storing a set of instruction, wherein an execution of the instruction will cause a method for assisting a wearer of a hearing aid to correctly arrange a hearing aid in and/or at an ear of the wearer to be performed, the method comprising:
accessing a camera of an electronic device;
determining if a head of the wearer is aligned with the camera;
determining if the head of the wearer has begun to rotate relative to the camera; and
initiating a capture sequence capturing a plurality of images, the plurality of images showing at least a part of the ear of the wearer with the hearing aid arranged in and/or at the ear as the head of the wearer rotates.

LIST OF REFERENCES

2 application
4 first electronic device
6 camera
8 display
10 hearing aid
12 ear
14 wearer
16 camera application
18 viewfinder
20 preview
22 wearer's head
24 capture sequence
26 plurality of images
28 second visual guide
30 bounding area
32 rotation angle images
34 second type of gesture
36 user interface
38 user input
40 finger(s)
42 system
44 second application
46 second electronic device
48 hearing care professional
100 application
102 providing access to a camera application
104 enabling a viewfinder of the camera application to display a preview of the field-of-view of the camera
106 determining if the wearer's head is aligned with the camera
108 determining if the wearer's head has begun to rotate relative to the camera
110 initiating a capture sequence capturing a plurality of images

The invention claimed is:

1. An electronic device comprising:
a camera, a display, and a processing unit;
wherein the electronic device is configured to assist a wearer of a hearing aid to correctly arrange a hearing aid in and/or at an ear of the wearer of the hearing aid;
wherein the processing unit of the electronic device is configured to determine whether a head of the wearer is aligned with the camera, and to determine whether the head of the wearer has begun to rotate relative to the camera; and
wherein the electronic device is configured to initiate a capture sequence capturing a plurality of images using the camera of the electronic device as the head of the wearer rotates, the plurality of images showing at least a part of the ear of the wearer with the hearing aid arranged in and/or at the ear, and wherein at least one of the images has a corresponding image-capture time that is after the head has begun to rotate and before a rotation of the head is completed.

2. The electronic device according to claim 1, wherein the electronic device is configured to automatically initiate the capture sequence upon determining that the head of the wearer has begun to rotate relative to the camera.

3. The electronic device according to claim 1, wherein the electronic device is configured to automatically initiate the capture sequence upon determining that the head of the wearer has rotated past an angle threshold relative to the camera.

4. The electronic device according to claim 1, wherein the electronic device is configured to determine if the ear of the wearer is captured by the camera.

5. The electronic device according to claim 1, wherein the electronic device is configured to automatically initiate the capture sequence upon determining that the ear of the wearer is captured by the camera.

6. The electronic device according to claim 1, further comprising one or more input devices, and wherein the electronic device is configured to provide a user interface.

7. The electronic device according to claim 1, wherein the electronic device is configured to automatically initiate the capture sequence upon receiving a user input.

8. The electronic device according to claim 1, wherein the electronic device is configured to indicate to the wearer that the plurality of images has been captured.

9. The electronic device according to claim 1, wherein the electronic device is configured to provide a first visual guide to assist the wearer in aligning his/her face with the camera.

10. The electronic device according to claim 9, wherein the electronic device is configured to provide a second visual guide to assist the wearer in rotating the head of the wearer relative to the camera.

11. The electronic device according to claim 1, wherein the electronic device is configured to define a bounding area, the bounding area encompassing the ear or a part of the ear of the wearer in the plurality of images, and wherein the electronic device is configured to crop the plurality of images based on the bounding area.

12. The electronic device according to claim 1, wherein the electronic device is configured to determine a level of image quality of one of the images, and remove the one of the images from the plurality of images if the level of image quality of the one of the images is below a quality threshold.

13. The electronic device according to claim 1, wherein the electronic device is configured to determine a level of similarity between one of the images in the plurality of images and a subsequent image in the plurality of images, and removing the subsequent image from the plurality of images if the level of similarity is above a similarity threshold.

14. The electronic device according to claim 1, wherein the electronic device is configured to provide feedback if the head of the wearer rotates and/or moves relative to the camera at a rotation speed above or below a threshold and/or outside a predefined position/area.

15. The electronic device according to claim 1, wherein the electronic device is configured to determine a representative image for the plurality of images, and provide the representative image via the display as a default image.

16. The electronic device according to claim 1, wherein the electronic device is configured to:

determine one or more rotation angle images, the one or more rotation angle images showing the head of the wearer oriented relative to the camera; and in response to a user selection of one or more affordances presented by the display, display the one or more rotation angle images, respectively.

17. The electronic device according to claim 1, wherein the electronic device is configured to detect a first type of gesture via one or more input devices, and in response to detecting the first type of gesture, provide the images as a video or individually for presentation by the display.

18. The electronic device according to claim 17, wherein the electronic device is configured to detect a second type of gesture via the one or more input devices, and in response to detecting the second type of gesture, provide the plurality of images for presentation via the display by shifting through the plurality of images depending on an orientation and a magnitude of the second type of gesture.

19. The electronic device according to claim 1, wherein the electronic device is configured to produce a composite 3D image based on the plurality of images.

20. The electronic device according to claim 1, wherein the camera is a digital camera, and/or an infrared camera, and/or a structured light scanner camera and/or a time of flight sensor providing 2D images and/or 3D images.

21. The electronic device according to claim 1, wherein the camera is a front-facing camera and/or a back-facing camera.

22. The electronic device according to claim 1, further comprising a 3D depth sensor, the 3D depth sensor configured to provide a data stream.

23. A system comprising the electronic device of claim 1, and a second electronic device;

wherein the first electronic device and the second electronic device are configured to allow communication between the wearer of the hearing aid and a hearing care professional during a tele-audiology session.

24. The system according to claim 23, wherein the plurality of images is transmitted to the second electronic device prior to or during the tele-audiology session.

25. The system according to claim 23, wherein the tele-audiology session comprises a live video call between the first electronic device and the second electronic device, and wherein the plurality of images are captured during the live video call.

26. A method performed by an electronic device for assisting a wearer of a hearing aid to correctly arrange a hearing aid in and/or at an ear of the wearer, the electronic device comprising a camera and a display, the method comprising:

determining, by the processing unit of the electronic device, whether a head of the wearer is aligned with the camera;

determining, by the processing unit of the electronic device, whether the head of the wearer has begun to rotate relative to the camera; and initiating, by the electronic device, a capture sequence capturing a plurality of images using the camera of the electronic device as the head of the wearer rotates, the plurality of images showing at least a part of the ear of the wearer with the hearing aid arranged in and/or at the ear, wherein at least one of the images has a corresponding image-capture time that is after the head has begun to rotate and before a rotation of the head is completed.

27. The method according to claim 26, wherein the capture sequence is initiated automatically upon determining that the head of the wearer has begun to rotate relative to the camera.

28. The method according to claim 26, wherein the capture sequence is initiated automatically upon determining that the head of the wearer has rotated past an angle threshold relative to the camera.

29. The method according to claim 26, further comprising determining if the ear of the wearer is captured by the camera.

30. The method according to claim 26, wherein the capture sequence is initiated automatically upon determining that the ear of the wearer is captured by the camera.

31. The method according to claim 26, further comprising providing a user interface.

32. The method according to claim 26, wherein the capture sequence is initiated automatically upon receiving a user input.

33. The method according to claim 26, further comprising providing an indication to the wearer that the plurality of images has been captured.

34. The method according to claim 26, further comprising providing a first visual guide to assist the wearer in aligning his/her face with the camera.

35. The method according to claim 34, further comprising providing a second visual guide to assist the wearer in rotating the head of the wearer relative to the camera.

36. The method according to claim 26, further comprising:

defining a bounding area, the bounding area encompassing the ear or a part of the ear of the wearer in the plurality of images; and cropping the plurality of images based on the bounding area.

37. The method according to claim 26, further comprising:

determining a level of image quality of one of the images; and removing the one of the images from the plurality of images if the level of image quality of the one of the images is below a quality threshold.

38. The method according to claim 26, further comprising:

determining a level of similarity between one of the images in the plurality of images and a subsequent image in the plurality of images; and removing the subsequent image from the plurality of images if the level of similarity is above a similarity threshold.

39. The method according to claim 26, further comprising provide feedback if the head of the wearer rotates and/or moves relative to the camera at a rotation speed above or below a threshold and/or outside a predefined position/area.

40. The method according to claim 26, further comprising:

determining a representative image for the plurality of images; and provide the representative image via the display as a default image.

41. The method according to claim 26, further comprising:

determining one or more rotation angle images, the one or more rotation angle images showing the head of the wearer oriented relative to the camera; and in response to a user selection of one or more affordances presented by the display, displaying the one or more rotation angle images, respectively.

42. The method according to claim 26, further comprising:

detecting a first type of gesture via one or more input devices; and in response to detecting the first type of gesture, providing the images as a video or individually for presentation by the display.

43. The method according to claim 42, further comprising:

detecting a second type of gesture via the one or more input devices; and in response to detecting the second type of gesture, providing the plurality of images for presentation via the display by shifting through the plurality of images depending on an orientation and a magnitude of the second type of gesture.

44. The method according to claim 26, further comprising producing a composite 3D image based on the plurality of images.

45. The method according to claim 26, wherein the camera is a digital camera, and/or an infrared camera, and/or a structured light scanner camera and/or a time of flight sensor providing 2D images and/or 3D images.

46. The method according to claim 26, wherein the camera is a front-facing camera and/or a back-facing camera.

47. The method according to claim 26, wherein the electronic device comprises a 3D depth sensor, and wherein the method comprises providing a data stream by the 3D depth sensor.

48. The method of claim 26, wherein the first electronic device is configured to communicate with a second electronic device during a tele-audiology session.

49. The method according to claim 48, wherein the plurality of images is transmitted to the second electronic device prior to or during the tele-audiology session.

50. The method according to claim 48, wherein the tele-audiology session comprises a live video call between the first electronic device and the second electronic device, and wherein the plurality of images are captured during the live video call.

51. A processor-readable non-transitory medium storing a set of instruction, wherein an execution of the instruction by a processing unit of an electronic device will cause a method to be performed by the electronic device for assisting a wearer of a hearing aid to correctly arrange a hearing aid in and/or at an ear of the wearer to be performed, the electronic device comprising a processing unit and a camera, the method comprising:

determining, by the processing unit of the electronic device, whether a head of the wearer is aligned with the camera;

determining, by the processing unit of the electronic device, whether the head of the wearer has begun to rotate relative to the camera; and initiating, by the electronic device, a capture sequence capturing a plurality of images using the camera of the electronic device as the head of the wearer rotates, the plurality of images showing at least a part of the ear of the wearer with the hearing aid arranged in and/or at the ear, wherein at least one of the images has a corresponding image-capture time that is after the head has begun to rotate and before a rotation of the head is completed.

52. The electronic device according to claim 1, wherein the at least one of the images has an associated camera angle with respect to the wearer that is between (1) a first camera angle corresponding with a front head view, and (2) a second camera angle corresponding with a side head view.

* * * * *